(12) United States Patent
Baron

(10) Patent No.: US 8,668,426 B1
(45) Date of Patent: Mar. 11, 2014

(54) DROP-FLOOR TRAILER

(71) Applicant: Ben Baron, Canyon Country, CA (US)

(72) Inventor: Ben Baron, Canyon Country, CA (US)

( * ) Notice: Subject to any disclaimer, the term of this patent is extended or adjusted under 35 U.S.C. 154(b) by 19 days.

(21) Appl. No.: 13/762,364

(22) Filed: Feb. 8, 2013

(51) Int. Cl.
*B60P 3/00* (2006.01)
(52) U.S. Cl.
USPC ............................ 414/458; 414/495; 414/917
(58) Field of Classification Search
USPC .......................................... 414/458, 495, 917
See application file for complete search history.

(56) References Cited

U.S. PATENT DOCUMENTS

| | | | |
|---|---|---|---|
| 3,823,917 A | 7/1974 | Watanabe | |
| 4,077,642 A | 3/1978 | Clark | |
| 5,536,131 A * | 7/1996 | Behr | 414/495 |
| 6,520,521 B2 | 2/2003 | Mayfield | |
| 7,322,627 B1 | 1/2008 | Nicholson | |
| 7,396,201 B2 | 7/2008 | Pollnow et al. | |
| 7,976,265 B2 | 7/2011 | Badry | |
| 8,123,241 B1 | 2/2012 | Chen | |

FOREIGN PATENT DOCUMENTS

| | | |
|---|---|---|
| EP | 0245104 | 11/1987 |
| EP | 1509421 | 3/2005 |

\* cited by examiner

*Primary Examiner* — Saul Rodriguez
*Assistant Examiner* — Willie Berry, Jr.

(57) ABSTRACT

Proposed is a wheeled drop-floor trailer that has a U-shaped frame with two articulated linkages pivotally installed on the sides of the U-shaped frame and suspension rods that pivotally support the drop floor in a freely hanging condition. On the side of the trailer opposite the loading side the articulated linkages are interconnected by a cross bar, which is connected to a drive mechanism, e.g., to a winch, via a cable. When the articulated linkages are inclined toward the loading side, the drop floor descends to the ground under its own weight and, after the cargo is loaded onto the drop floor, the latter is raised by pulling the linkages with the use of the winch via the cable and the cross bar in the direction opposite the loading side.

3 Claims, 4 Drawing Sheets

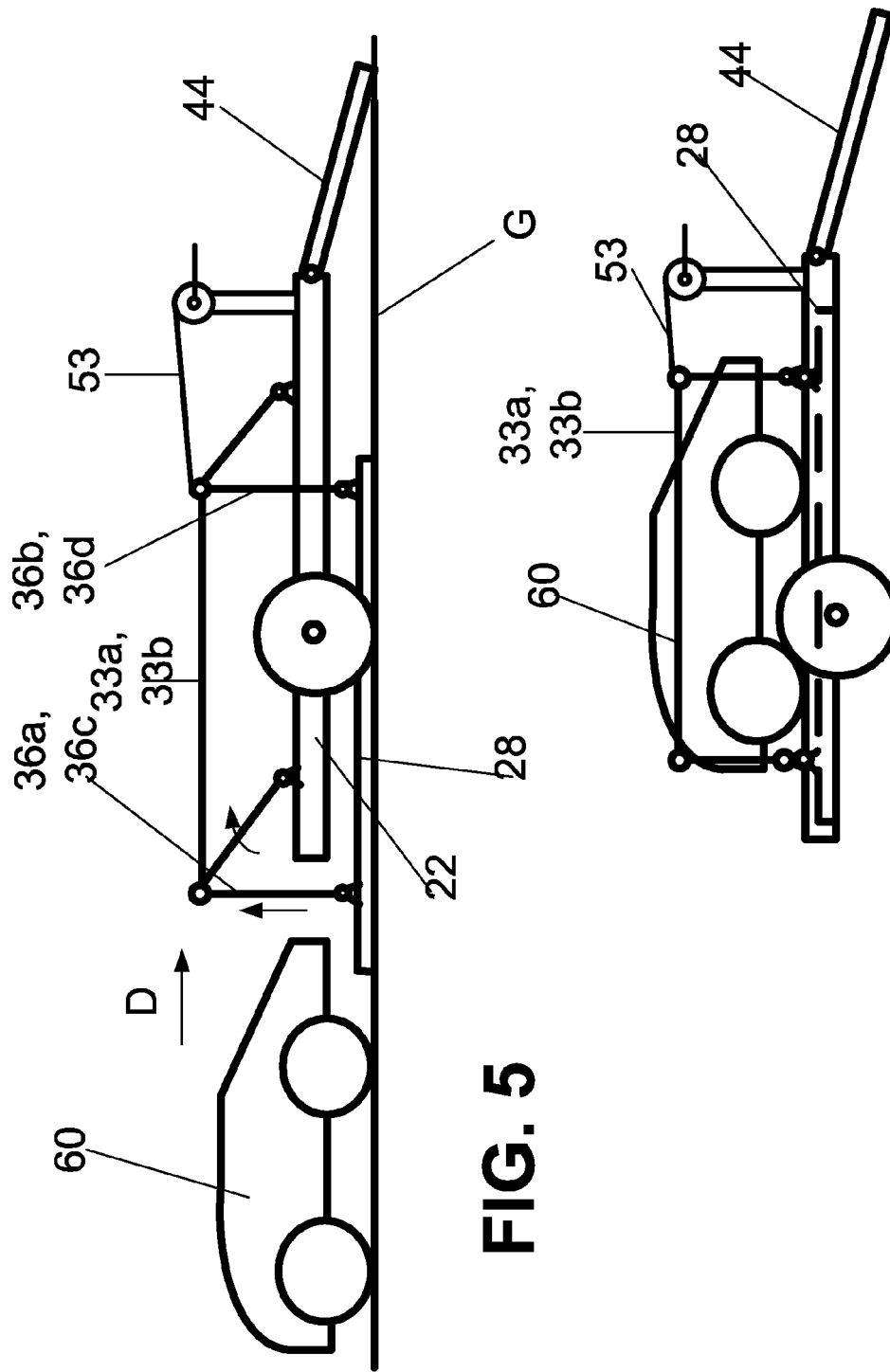

DROP-FLOOR TRAILER

FIELD OF THE INVENTION

The present invention relates to trailers, more particularly to a drop-floor trailer having a flat bed or floor that is oriented horizontally and can be lowered to ground level for loading equipment, such as a motorcycle, a small vehicle, a container, etc., and then can be raised to an upper position that provides clearance over the ground sufficient for towing trailed cargo by a drive vehicle.

For example, among a great variety of other flatbed trailers are roof-free flatbed trailers, which are known in the art, employing an articulated linkage mechanism for lowering a flatbed, which is also known as a carrier bed, or drop floor, to the ground for loading cargo to the horizontally oriented drop floor without the use of a tilted ramp and for subsequent lifting of the drop floor with the cargo to the level sufficient for hauling the loaded trailer by a vehicle to which it is hitched. In the trailer of such a type, the drop floor typically remains parallel to the level of the ground during movement as well as in the lowermost and uppermost positions.

For example, U.S. Pat. No. 6,113,130 issued on Sep. 5, 2000 to Roger Daulce discloses a multipurpose trailer with a suspended, articulated platform. The device comprises a platform on which is pivotally attached a cradle formed of two interdependent arms of a shaft spanning the platform transversely near the longitudinal center of the platform. The forearms are pivotally connected to each other. The top of each arm is linked to a fork made up of two tie beams and a T-shaped tow bar. The tie beams are pivotally connected to each other as well. The hitch device is linked to the hauling vehicle, which, when moving forward, exerts a force. This towing force results in the raising of the platform so that it pivots around the axles of the force arms. This rotation takes place around the wheel shafts so that they become locked with the aid of the wedges, and in the upright position, the tie beams are locked against the forearms. In other words, the device comprises an articulated linkage mechanism, one link of which comprises the drop floor.

European Patent Publication EP0245104 (A2) published on Nov. 11, 1987 (inventor, Chown Peter Arthur Charles) discloses a trailer comprising a body and a load-carrying floor forming a part of that body; means selected from the group comprising wheels, skids, and struts supporting the floor above the ground on which the trailer stands when in use; and means to hitch the trailer to a towing vehicle. The trailer is characterized by the provision of first means linking the trailer floor to the remainder of the trailer body such that the floor can be dropped from the body to the ground for loading; second, power-aided means to raise the trailer floor and its load subsequently back into the body; and third means to secure the trailer floor and its load in the raised position for transporting the load by the trailer. In fact, the trailer comprises the drop floor which is connected to an articulated linkage parallelogram, one link of which comprises the drop floor.

A common disadvantage of both known trailers is that the drop floor per se functions as a closing part of the articulated linkage mechanism and therefore, in addition to the weight of the cargo, experiences a part of the load caused by the floor lifting-dropping force.

SUMMARY OF THE INVENTION

A flat drop-floor trailer of the present invention comprises a U-shaped frame on at least two wheels that are rotationally installed on independent axles in the side members of the U-shaped frame so that the space of the frame between the side members of the U-shaped configuration remains unobstructed for placing in that space the flat drop floor. Each side member of the U-shaped frame pivotally supports vertical struts, the upper ends of which are interconnected by a horizontal bar that is pivotally linked to said upper ends of the struts. As a result, on each side of the trailer the struts, horizontal bar, and side members of the U-shaped frame form an articulated four-link parallelogram with two freedoms of movement in the plane of the parallelogram.

Furthermore, the interconnected ends of the vertical struts pivotally support the suspension rods, the opposite ends of which pivotally support the sides of the drop floor so that the drop floor appears suspended on the suspension rods, which freely hang on their pivots installed in the struts of the articulated parallelogram. On the side opposite the loading end of the drop floor, the upper ends of the articulated parallelograms are interconnected by a cross bar, which is also connected to the respective struts in an articulated manner.

On the side opposite the loading end of the drop floor, the U-shaped frame has a projection for attachment of a towing hitch and of a device for lifting the drop floor with the cargo to the transportation position and for locking the floor in the raised position. More specifically, before loading, e.g., of a small vehicle, the drop floor, which is freely suspended on the suspension rods, can descend to the ground by unlocking the drop-floor mechanism from the frame and inclining the articulated parallelogram away from the towing hitch and pushing the cross bar toward the cargo side, e.g., manually.

As soon as the drop floor rests on the ground, the cargo can be moved to the floor in the horizontal direction, i.e., loading the cargo without a ramp. For example, a small car or a motorcycle can be slowly driven onto the flat floor. On completion of loading, the articulated mechanism is pulled back toward the towing hitch by means of the drive mechanism, e.g., a winch or a motor via a link pivotally connected to the cross bar. The vertical struts are turned around their support axles, and the suspension bars are raised together with the loaded drop floor. When the drop floor is raised to the required height above the ground, its position is locked relative to the wheeled frame. Now the trailer is ready for towing, provided that it is hitched to a drive vehicle.

Thus, it can be seen that since the drop floor is freely suspended from the articulated mechanism, it does not perceive any load except for its own weight and the weight of the cargo. The structure is simple in construction and use and is inexpensive to manufacture.

BRIEF DESCRIPTION OF THE DRAWINGS

FIG. 5 is a side view of the drop-floor trailer of the invention with the drop floor on the ground prior to loading cargo.

FIG. 6 is a side view of the drop-floor trailer of the invention with the cargo on the drop floor in the position ready for transportation.

DETAILED DESCRIPTION OF THE INVENTION

Figure 1:
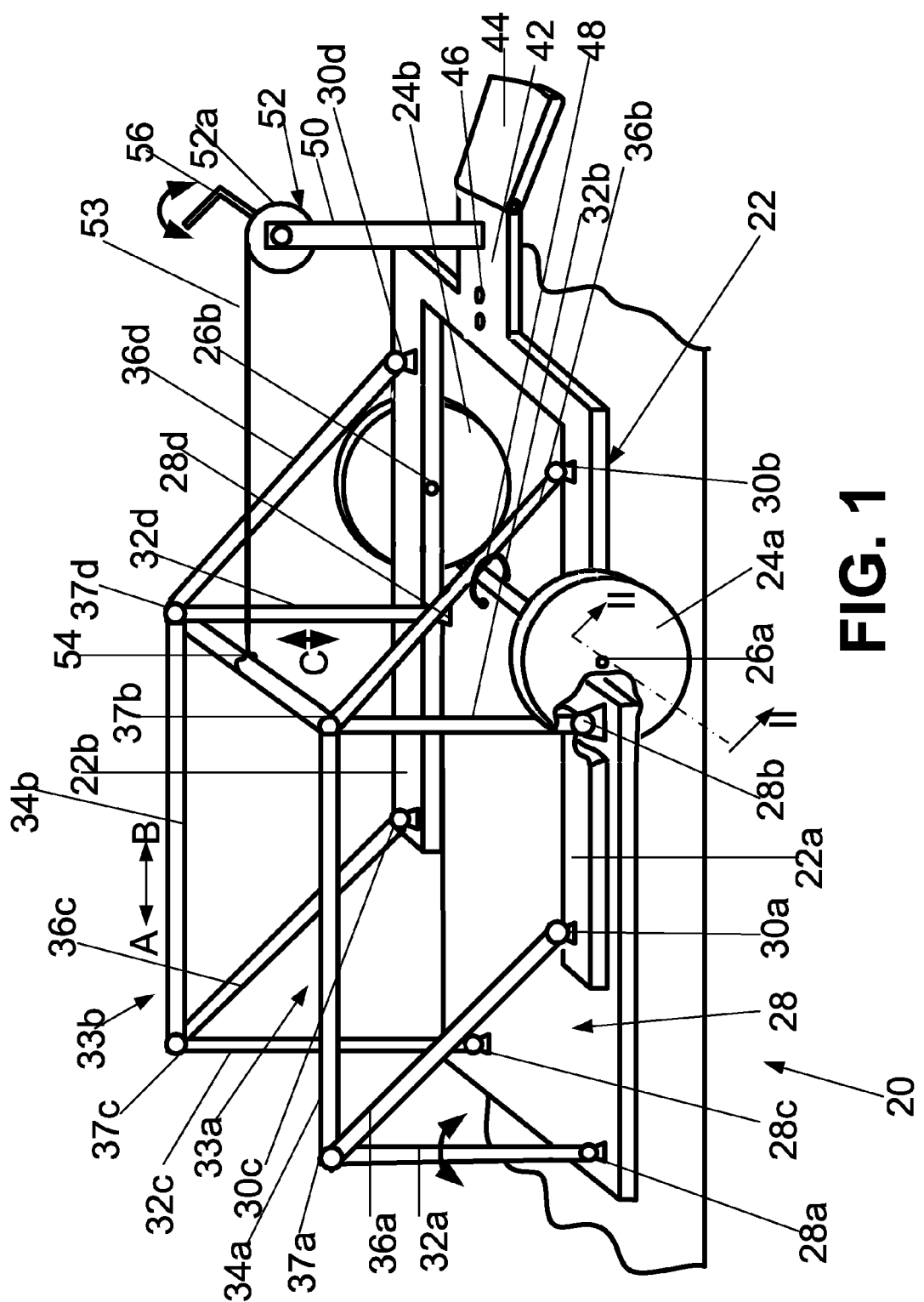
FIG. 1 is a schematic three-dimensional view of the drop-floor trailer of the invention with the drop floor resting on the ground.

A flat drop-floor trailer of the present invention (hereinafter referred to as a "drop-floor trailer"), which as a whole is designated by reference numeral 20, is shown in FIG. 1, which is a schematic three-dimensional view of the drop-floor trailer. As shown in FIG. 1, the drop-floor trailer 20 has a U-shaped frame 22 that is supported by at least two wheels 24a and 24b rotationally installed on independent axles 26a and 26b in side members 22a and 22b of the U-shaped frame 22 so that the space of the frame between the side members 22a and 22b of the U-shaped configuration remains unobstructed for placing the flat drop floor 28 in that space.

Each side member 22a and 22b of the U-shaped frame 22 pivotally supports vertical struts 32a, 32b, 32c, and 32d by pivots 30a, 30b, 30c, and 30d. The upper ends of the struts are interconnected by respective horizontal bars 34a and 34b that are pivotally linked to said upper ends of the struts.

As a result, on each side of the trailer 20, the struts 32a, 32b, 32c, and 32d, the horizontal bars 34a and 34b, and the side members 22a and 22b of the U-shaped frame 22 form two articulated four-link parallelograms 33a and 33b with two freedoms of movement in the plane of the parallelograms.

Figure 2:
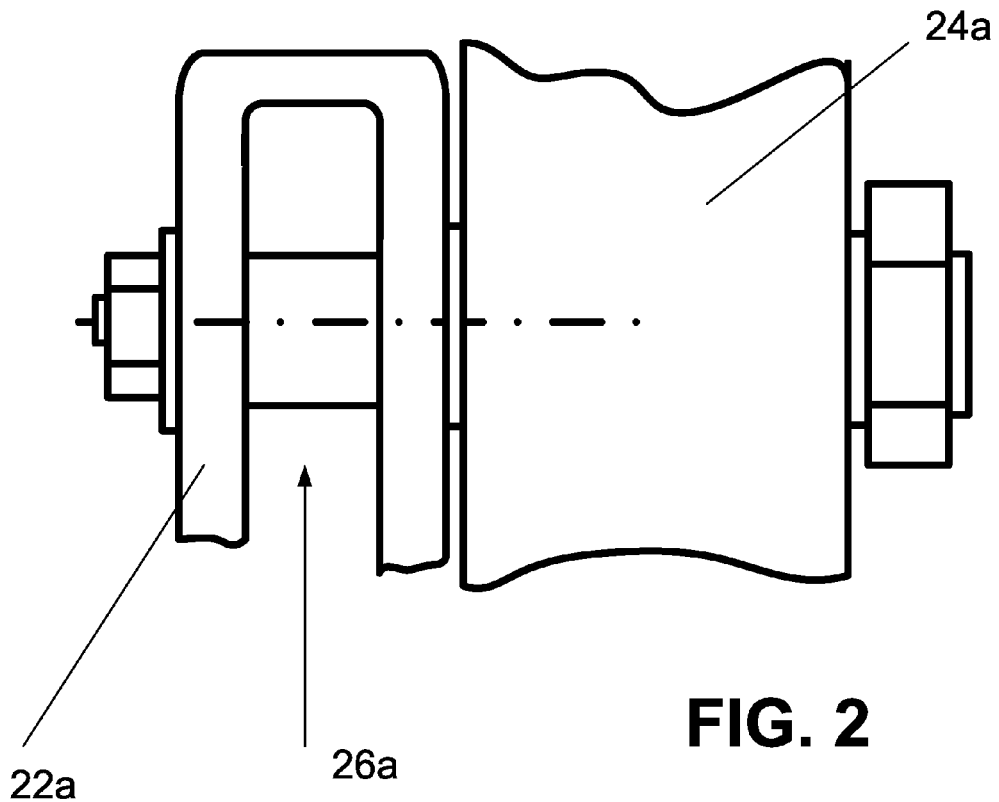
FIG. 2 is a sectional view along the line II-II of FIG. 1.

Attachment of wheels 24a and 24b to the side members 22a and 22b is shown in FIG. 2, which is a sectional view along the line II-II of FIG. 1. Although FIG. 2 relates only to the wheel 24a, it is understood that the wheel 24b is attached in the same manner. It is also understood that the mechanism shown in FIG. 2 is given only as an example and that the wheels can be installed on ball-bearing supports rather than on slide bearings.

Figure 3:
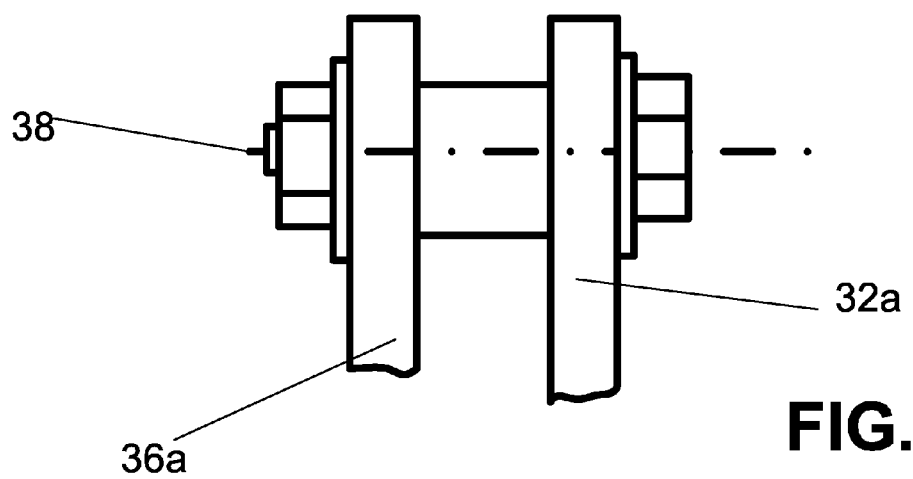
FIG. 3 is a sectional view along the line III-III of FIG. 1.

Furthermore, the interconnected ends of the vertical struts 32a, 32b, 32c, and 32d pivotally support suspension rods 36a, 36b, 36c, and 36d. This connection is shown in FIG. 3, which is a sectional view along line III-III of FIG. 1. Reference numerals 37a, 37b, 37c, and 37d designate pivots that connect the vertical struts 32a, 32b, 32c, and 32d to the suspension rods 36a, 36b, 36c, and 36d, respectively.

Although FIG. 3 relates only to pivotal connection 37a of the suspension rod 36a to the upper end of the vertical strut 32a, it is understood that the remaining three connections are the same. In FIG. 3, reference numeral 38 designates an axle, 36a is a suspension rod, and 32a is a vertical strut.

As shown in FIG. 1, the lower ends of the suspension rods 36a, 36b, 36c, and 36d, i.e., the ends of the rods opposite the connections to the vertical struts, pivotally support the drop floor 28 by pivots 28a, 28b, 28c, and 28d which are located substantially at four corners of the flat platform that forms the drop floor 28. As a result, the drop floor 28 appears to be suspended on the suspension rods 36a, 36b, 36c, and 36d and freely hangs on the axles, such as the axle 38 shown in FIG. 3, installed in the struts, such as the strut 32a, of the articulated parallelogram. On the side opposite the loading end of the drop floor 28, i.e., on the right side of the trailer as shown in FIG. 1, the right upper ends of the articulated parallelograms 33a and 33b are interconnected by a cross bar 40, which is also connected to the respective struts 32b, 32c and the suspension rods 36b, 36d in an articulated manner. On the same side as the cross bar 40, the U-shaped frame 22 has a projection 42 with a towing hitch 44 for attachment of the trailer to a transportation vehicle (not shown). Furthermore, the projection frame 22 and the drop floor 28 have means for locking the drop floor 28 in the raised position. As an example, these means are shown as holes 46 in the frame 22 and a hook 48 on the adjacent side of the drop floor 28.

Attached to the projection 42 is a vertical stand 50. The upper end of the stand 50 supports a drop-floor raising mechanism, which in the illustrated embodiments comprises a winch 52 having a drum 52a with a cable 53 wound on it. One end of the cable is attached to the drum 52a and the other end is connected to the cross bar 40 at a point 54. In the modification of FIG. 1, the winch has a manual drive in the form of a crank 56. Construction of the winch is conventional and is beyond the scope of the present invention.

Figure 4:
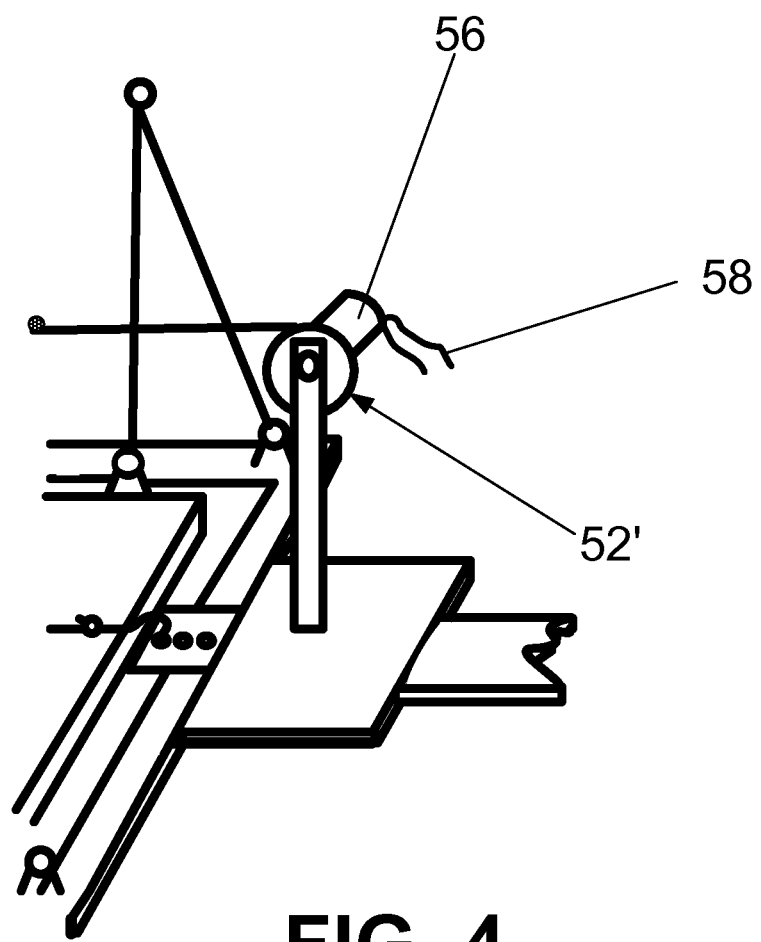
FIG. 4 is a fragmental view of the trailer of FIG. 1 with a power winch for raising the drop floor to the transportation position.

Alternatively, the frame can be driven from a power winch 52' shown in FIG. 4. The power winch 52' is driven from an electric motor 56', which can be energized via wires 58, e.g., from a 12V outlet socket of the electric system of the vehicle located on the rear side of the vehicle (not shown).

The use of the drop-floor trailer 20 of the present invention will now be described with reference to FIGS. 5 and 6, where FIG. 5 is a side view of the drop-floor trailer of the invention with the drop floor on the ground prior to loading cargo. FIG. 6 is a side view of the drop-floor trailer of the invention with the cargo on the drop floor in the position ready for transportation.

Before loading, e.g., of a small vehicle 60 (FIG. 5), the drop floor 28, which is freely suspended on the suspension rods 36a, 36b, 36c, and 36d, is lowered to the ground G by unlocking the drop-floor locking mechanism 48, 50 (FIG. 1) from the frame 22 and inclining the articulated four-link parallelograms 33a and 33b away from the towing hitch 44 in the direction of arrow A (FIG. 1) and allowing the drop floor to be lowered under its own gravity (in the direction of the arrow C shown in FIG. 1). For this purpose the cable 53 is released by reversing the drum 52a manually or by reversing the motor 56' (FIG. 4).

As soon as the drop floor reaches the ground, the vehicle 60 can be loaded by being driven onto the drop floor in the horizontal direction shown by arrow D in FIG. 5. On completion of loading, the articulated mechanism is pulled back toward the towing hitch in the direction of arrow B (FIG. 1) by means of the drive mechanism, e.g., the winch 52 (FIG. 1) or the winch 52' (FIG. 4) via the cable 53 connected to the cross bar 40. The vertical struts 32a, 32b, 32c, and 32d are turned around their support axles 30a, 30b, 30c, and 30d, respectively, and the suspension bars 36a, 36b, 36c, and 36d together with the loaded drop floor 28 are raised as shown in FIG. 6, preserving their vertical orientation under their own weight and the weight of the cargo, i.e., the vehicle 60.

When the drop floor is raised to a required height above the ground G, its position is locked relative to the wheeled frame 22 by means of the locking mechanism 48, 50. Now the trailer 20 is ready for towing, provided that it is hitched to a drive vehicle.

Thus, it can be seen that since the drop floor 28 is freely suspended from the articulated mechanism, it does not perceive any load except for its own weight and the weight of the cargo. The structure is simple in construction and use and is inexpensive to manufacture.

Although the invention herein is described with reference to specific examples and drawings, it is understood that these examples and drawings should not be construed as limiting the application of the invention and that any changes and modifications are possible without departure from the scope of the attached patent claims. For example, the drop floor can be suspended on chains instead of suspension rods. The trailer may have side walls or a complete enclosure. The drop is not necessarily a plate and may comprise a pair or several flat strips. The winch can be replaced with a linear pulling mechanism. The drop-floor locking mechanism is shown as a hook and holes only as an example for simplicity in the drawing. The locking mechanism may comprise, e.g., a pull-action toggle claim such as one distributed by McMaster Carr, N.J., a tool supply company.

The invention claimed is:

1. A drop-floor trailer comprising a wheeled U-shaped frame having side members, an open side, and a closed side opposite the open side; a raising/descending mechanism installed on the U-shaped frame of the trailer; a drive mechanism for the raising/descending mechanism installed on the closed side of the U-shaped frame; and a drop floor positioned within the U-shaped frame in a space between the side members without contact therewith and freely suspended from the raising/descending mechanism under its own gravity on suspension rods, wherein the raising/descending mechanism comprises a pair of articulated linkage parallelograms installed on the side members and wherein each articulated linkage mechanism of the pair is installed on a respective side member of the U-shaped frame and comprises an articulated linkage parallelogram, one link of which comprises a respective side member, a pair of vertical struts, one end of which is pivotally connected to the respective side member and the other end of which is interconnected through a horizontal bar that is pivotally connected to said other ends, one vertical strut of the pair being located adjacent to the open end of the U-shaped frame and the other vertical strut being located adjacent to the closed end of the U-shaped frame, said other ends of the vertical struts located adjacent to the closed side of the U-shaped frame being interconnected with a cross bar that is pivotally connected to said other ends located adjacent to the closed side of the U-shaped frame; wherein the suspension rods being pivotally connected to said other ends of the vertical struts.

2. The drop-floor trailer according to claim 1, wherein the drive mechanism comprises a winch having a drum, a cable wound on the drum one, end of which is connected to the drum and the other end of which is connected to the cross bar.

3. The drop-floor trailer according to claim 2, further comprising a locking mechanism for locking the drop floor to the U-shaped frame when the drop floor is in the raised position.

* * * * *